(12) United States Patent
Tavares et al.

(10) Patent No.: US 7,127,948 B2
(45) Date of Patent: Oct. 31, 2006

(54) PIEZOELECTRIC SENSOR, SENSOR ARRAY, AND ASSOCIATED METHOD FOR MEASURING PRESSURE

(75) Inventors: Matthew R. Tavares, Federal Way, WA (US); Donald G. Morris, Renton, WA (US); Richard R. Basham, Kent, WA (US); James M. Gillmore, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 11/100,794

(22) Filed: Apr. 7, 2005

(65) Prior Publication Data

US 2006/0179952 A1     Aug. 17, 2006

Related U.S. Application Data

(63) Continuation-in-part of application No. 11/059,833, filed on Feb. 17, 2005, now abandoned.

(51) Int. Cl.
*G01P 15/09* (2006.01)
(52) U.S. Cl. .................................. 73/514.34; 310/326
(58) Field of Classification Search .................. 73/754, 73/514.34; 310/326, 366
See application file for complete search history.

(56) References Cited

U.S. PATENT DOCUMENTS

| | | | |
|---|---|---|---|
| 5,406,682 A * | 4/1995 | Zimnicki et al. .......... 29/25.35 |
| 5,457,630 A | 10/1995 | Palmer | |
| 5,687,462 A * | 11/1997 | Lazarus et al. ............. 29/25.35 |
| 5,737,222 A | 4/1998 | Palmer | |
| 6,002,972 A | 12/1999 | Palmer | |
| 6,404,107 B1 * | 6/2002 | Lazarus et al. ............. 310/328 |
| 6,681,631 B1 * | 1/2004 | Apel ....................... 73/514.34 |
| 6,752,020 B1 | 6/2004 | Sobotta et al. | |
| 6,989,623 B1 * | 1/2006 | Zeighami .................... 310/317 |

* cited by examiner

*Primary Examiner*—Edward Lefkowitz
*Assistant Examiner*—Andre Allen
(74) *Attorney, Agent, or Firm*—Alston & Bird LLP

(57) ABSTRACT

A sensor, sensory array, and associated method for measuring a pressure are provided. The sensor includes a piezoelectric sensory device that is disposed on an electrically insulative substrate that can be adhered to a member for measuring the pressure on the member. The piezoelectric sensory device defines first and second contact surfaces and is adapted to provide an electric potential between the surfaces that corresponds to a pressure on the piezoelectric sensory device. Conductive terminals are in electrical communication with the piezoelectric sensory device and therefore also provide the electric potential indicative of the pressure on the surface of the test member. An electrically insulative sheet is disposed opposite the piezoelectric sensory device from the substrate. An electronic monitoring device can be electrically connected to the piezoelectric sensory device via the terminals and configured to monitor the electric potential provided by the piezoelectric sensory device.

26 Claims, 3 Drawing Sheets

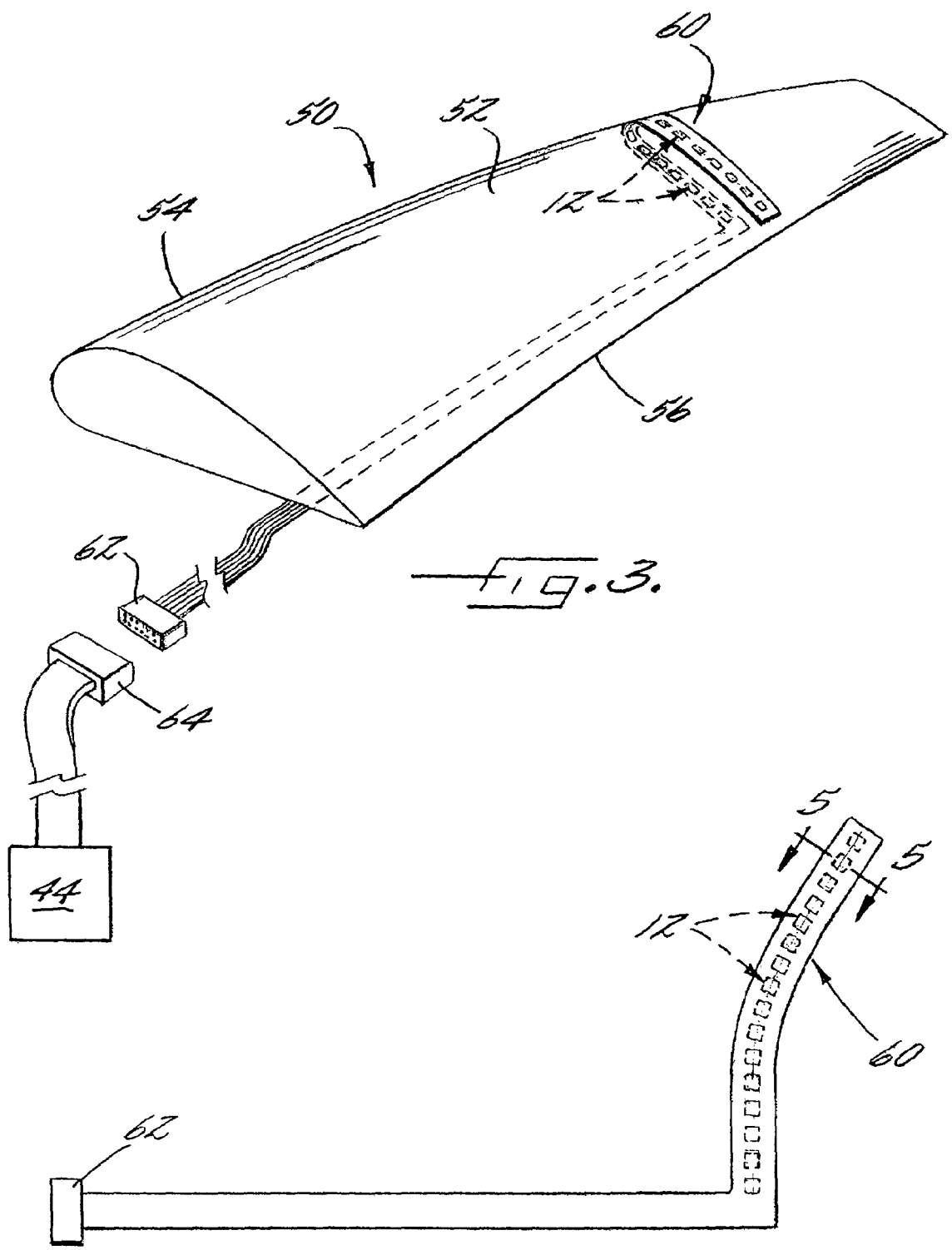

PIEZOELECTRIC SENSOR, SENSOR ARRAY, AND ASSOCIATED METHOD FOR MEASURING PRESSURE

CROSS-REFERENCES TO RELATED APPLICATIONS

This application is a continuation-in-part of U.S. patent application Ser. No. 11/059,833, filed on Feb. 17, 2005, now abandoned which is hereby incorporated herein in its entirety by reference.

FIELD OF THE INVENTION

The present invention relates to the measurement of pressure and, in particular, relates to a sensor and method for measuring pressure on a surface of a test member such as an airfoil.

DESCRIPTION OF RELATED ART

Wind tunnel testing is often used for testing vehicles such as airplane. For example, a portion of an aircraft or a full or partial model of an aircraft can be positioned in a wind tunnel and subjected to a flow of air to determine characteristics of the member. According to one typical testing method, the static and dynamic pressures are measured at a number of positions on the surface of the test member. For example, pressure monitoring devices can be disposed on the wings, vertical or horizontal tail sections, or other portions of the test member to determine the pressures and changes in pressures at each position.

One typical device for monitoring pressure during such a testing operation includes an electrical device configured to provide an electrical signal based on resistance changes that correspond to the pressure exerted on the monitoring device. One such monitoring device is generally cylindrical, with a diameter of about 0.09 inch and a length of about 0.25 inch. The device is positioned on the test member by drilling a hole in the test member and inserting the device in the hole so that a first end of the device is configured to receive the pressure on the outer surface of the test member. Electrical wires for communicating an electrical signal representative of the pressure extend from the opposite end of the monitoring device, which is typically disposed in the interior of the test member and/or by running channels machined into the exterior opposite surface. One such monitoring device is available from Kulite Semiconductor Products, Inc. of Leonia, N.J.

Conventional pressure monitoring devices can be used for accurate measurement of pressures over the surface of a test member during a testing operation. However, the number of such pressure monitoring devices that can be disposed on a particular test member is limited by the size of the devices. The size of each device also restricts the locations in which the devices can be provided. For example, the devices can be too large for mounting on small surfaces, in thin portions, or at sharp edges of the test member. In addition, the placement of each device requires a hole to be drilled in the test member and addition of a channel to route the wires, thereby further limiting the number of devices that can be disposed on a single test member. Further, once the holes and channels are formed in the test member and the devices are mounted in the holes, the devices cannot be easily repositioned. The formation of the holes and channels also typically results in significant modification and structural weakening of the test device.

Thus, a need exists for an improved sensor and associated method for performing such testing of a test member. The sensor should be capable of being disposed at various locations on the test member and subsequently removed and/or repositioned. The sensor should be configurable in arrays and should be compatible with a testing method that does not require significant modification of the test member.

SUMMARY OF THE INVENTION

The present invention provides a sensor, sensory array, and associated method for measuring a pressure. The sensor and array are configured to be disposed on a surface of the member to measure pressure on the surface of the member. The sensor includes a piezoelectric sensory device that is disposed on an electrically insulative substrate, which can be adhered to the test member, e.g., by an adhesive film disposed on the substrate opposite the piezoelectric sensory device. The piezoelectric sensory device is adapted to provide an electric potential or charge (hereafter referred to as "electric potential") between the first and second contact surfaces, which corresponds to a pressure on the piezoelectric sensory device. The sensor also includes electrically conductive terminals in electrical communication with the piezoelectric sensory device so that the terminals provide the electric potential that is indicative of the pressure on the surface of the test member. For example, the substrate can be a flexible circuit and at least one of the terminals can be connected to the piezoelectric sensory device via an electrical circuit path printed on the flexible circuit. An electrically insulative sheet is disposed opposite the piezoelectric sensory device from the substrate, and the sheet can include a metallic layer adapted for electromagnetically shielding the piezoelectric sensory device. An electronic monitoring device can be electrically connected to the piezoelectric sensory device via the terminals and configured to monitor the electric potential provided by the piezoelectric sensory device.

The sensor can be flexible so that the sensor can be disposed on the test member in a configuration corresponding to a contour of the test member. For example, the substrate can be formed of polyimide tape. The piezoelectric sensory device can be formed of a sheet of a polymer such as polyvinylidene fluoride, and the piezoelectric sensory device can be less than about 0.001 inch thick and/or the sensor can have a thickness of less than about 0.01 inch. In some cases, each dimension of the piezoelectric sensory device can be smaller than about 0.2 inch. The electrically insulative sheet can be formed of a flexible sheet of polyimide or polyester.

A plurality of piezoelectric sensory devices can be disposed in an array on the substrate. Each sensory device defines first and second contact surfaces and is adapted to provide an electric potential between the contact surfaces corresponding to a pressure on the respective test member. Electrically conductive terminals in electrical communication with the piezoelectric sensory devices provide the electric potentials between the contact surfaces of each piezoelectric sensory device. Thus, the sensor array detects a pressure on the surface of the test member at a position corresponding to each piezoelectric sensory device.

According to one method, a piezoelectric sensory device is disposed on an electrically insulative substrate, and an electrically insulative sheet is disposed opposite the piezoelectric sensory device from the substrate so that the piezoelectric sensory device is disposed between the substrate and the insulative sheet. First and second contact surfaces of the piezoelectric sensory device are electrically connected to conductive terminals so that the piezoelectric sensory device is configured to provide an electric potential between the terminals corresponding to a pressure on the piezoelectric sensory device. The terminals can be formed by printing an electrical circuit on a flexible circuit. The substrate, piezoelectric sensory device, and electrically insulative sheet are adhered to the surface of the member with the substrate directed toward the member. The electric potential between the terminals is detected to determine the pressure on the surface of the member.

The substrate can be adhered to the test member by disposing an adhesive film on the substrate opposite the piezoelectric sensory device. The piezoelectric sensory device and insulative sheet can be disposed on the substrate before the substrate is adhered to the member. Further, the sensor can be flexed to a contour of the surface of the member. For example, the piezoelectric sensory device can be adhered to an airfoil, and the air pressure on the airfoil can then be detected. In some cases, a plurality of piezoelectric sensory devices can be disposed between the substrate and the insulative sensory device so that the pressure on the surface of the test member can be determined at each of the piezoelectric sensory devices.

BRIEF DESCRIPTION OF THE DRAWINGS

The accompanying drawings illustrate preferred and exemplary embodiments and are not necessarily drawn to scale.

FIG. 3 is a perspective view illustrating an array of sensors disposed on an aircraft wing.

FIG. 4 is a plan view illustrating the array of the sensors of FIG. 3 in a flat configuration before being disposed on the test member.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth. Like numbers refer to like elements throughout.

Figure 1:
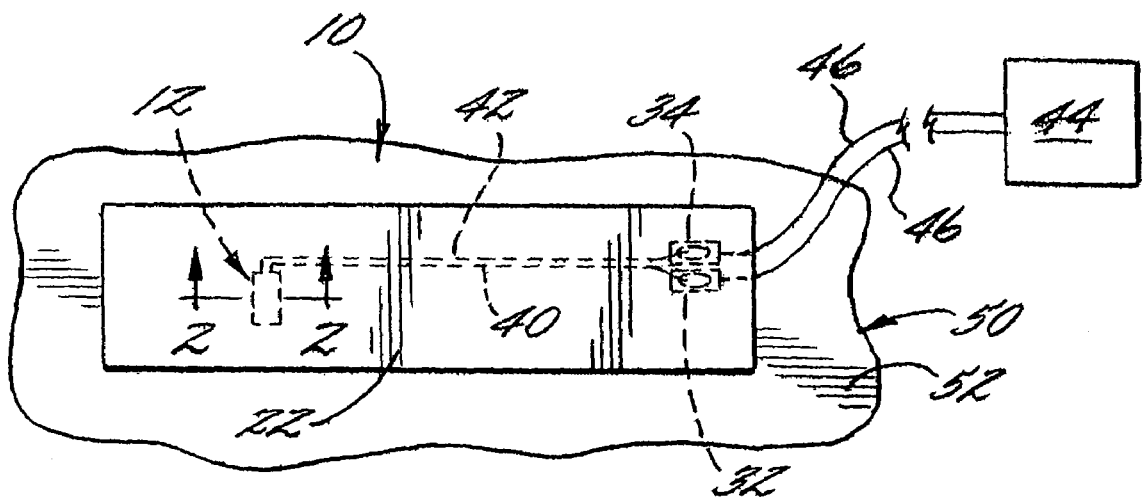
FIG. 1 is a plan view illustrating a sensor.

A sensor 10 for measuring a pressure or force is shown in FIG. 1. The sensor 10 is configured to be disposed on a surface 52 of a test member 50 for measuring the pressure exerted on the test member 50 (FIG. 3). The sensor 10 can be disposed on, and attached to, various test members. Further, by the term "test," it is meant that the sensor 10 is disposed on the member 50 during normal operation of the member, and the operation can be a typical operation of the member, an experimental operation, or otherwise. For example, the test member 50 can be an airfoil, such as a wing during aerodynamic testing of the wing, and the sensor 10 can be used to detect the pressure on the airfoil during operation of the airfoil in a wind tunnel, during flight, or otherwise. The sensor 10 can alternatively be used to determine the pressure on other test members such as a surface of an automobile or other air, land, or water vehicle; a surface of a building, bridge, or road surface; a surface of detection or communication equipment; and the like. The sensor 10 can be disposed and operated individually or in an array 60 for testing the pressure over an area of the surface 52.

Figure 2:
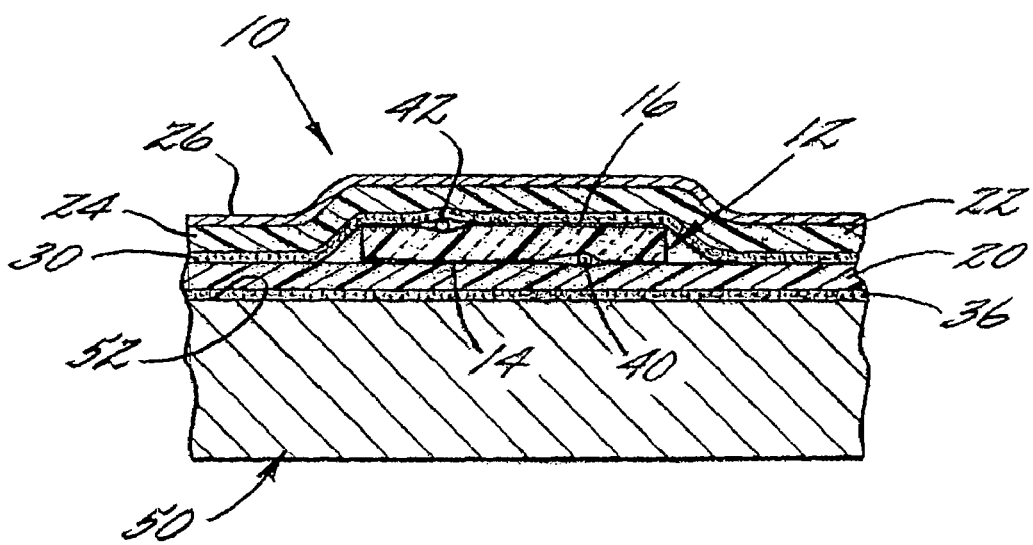
FIG. 2 is a section view as seen along line 2—2 of FIG. 1.

The sensor 10 includes a piezoelectric sensory device 12, which can be a layer of piezoelectric material that defines first and second electrical contact surfaces 14, 16, which are typically on opposite sides of the piezoelectric sensory device 12, as shown in FIG. 2. The piezoelectric sensory device 12 is adapted to provide an electric potential between the contact surfaces 14, 16 corresponding to a pressure or force that is exerted on the piezoelectric sensory device 12. In this regard, the piezoelectric sensory device 12 can include various materials with piezoelectric characteristics, i.e., materials that generate an electric potential when subjected to a stress or strain. For example, the piezoelectric sensory device 12 can be formed of polyvinylidene fluoride (PVDF), a ferromagnetic polymer that exhibits strong piezoelectric properties, e.g., by generating an electric potential when subjected to strain. Various other piezoelectric materials can alternatively be used, including other polymeric piezoelectric materials or ceramic piezoelectric materials such as lead zirconate titanate (PZT), lead titanate (PT), lead metaniobate ($PbNb_2O_6$), and the like. The sensors 10 can provide varying degrees of accuracy, such as accuracy within a range of about 5–15% of full scale output (FSO), which is typically acceptable for buffet and flow separation measurements. The sensors 10 can be configured to withstand environmental conditions, e.g., rugged for handling and installation; port-free and otherwise resistant to water and moisture; and resistant to high and low temperatures.

As illustrated in FIG. 2, the piezoelectric sensory device 12 can be sandwiched between a substrate 20 and an insulative sheet 22. The substrate 20 and the sheet 22 are each typically formed of an electrically insulative material. For example, the substrate 20 and the sheet 22 can be formed of polyester, or polyimide materials such as Kapton® polyimide film or tape, a trademark of E.I. du Pont de Nemours and Company. Alternatively, the substrate 20 and sheet 22 can be formed of other materials, which are typically flexible and electrically insulative. That is, the substrate 20 and sheet 22 are typically sufficient flexible or otherwise deformable so that the piezoelectric sensory device 12 is deformed by a pressure provided against the sensor 10.

In some cases, the substrate 20 and/or the sheet 22 can also include a material, such as a metallic plated material, that is adapted for electromagnetically shielding the piezoelectric sensory device 12. For example, the insulative sheet 22 can include a metallic layer 26 such as aluminum that is adapted for electromagnetically shielding the piezoelectric sensory device 12. The metallic layer 26 can be vapor deposited or otherwise disposed on a film 24 or other structure formed of materials such as polyimide, Mylar® material, a trademark of E.I. du Pont de Nemours and Company, or the like. The insulative sheet 22 can be sufficiently large to cover the entire substrate 20, or the insulative sheet 22 can be smaller than the substrate 20, e.g., so that the insulative sheet 22 covers the piezoelectric sensory device 12. An adhesive material can be provided between the various layers of the sensor 10. In this regard, one or more adhesive film 30 can be provided between the substrate 20 and the insulative sheet 22 so that the piezoelectric sensory device 12 is adhered or bonded between the substrate 20 and the sheet 22.

The sensor 10 also defines electrically conductive terminals 32, 34 in electrical communication with the contact surfaces 14, 16 of the piezoelectric sensory device 12 so that the terminals 32, 34 are configured to provide an electric potential that is indicative of the electric potential between the contact surfaces 14, 16. Thus, the electric potential provided between the terminals 32, 34 is indicative of the electric potential between the contact surfaces 14, 16 and, hence, indicative of the pressure on the sensor 10. For example, the terminals 32, 34 can be metal pads that are provided on the substrate 20 separately from the piezoelectric sensory device 12. Each of the terminals 32, 34 can be electrically connected to a respective one of the contact surfaces 14, 16 of the piezoelectric sensory device 12 by a copper wire, a metallic trace on a flexible circuit, or another electrically conductive member. For example, a first wire 40 can connect the first electrical contact surface 14 of the piezoelectric sensory device 12, i.e., the first side of the piezoelectric sensory device 12, to the first terminal 32, and a second wire 42 can connect the second electrical contact surface 16 of the piezoelectric sensory device 12, i.e., the second side of the piezoelectric sensory device 12 opposite the first side, to the second terminal 34. The sensors 10 can incorporate various protocols such as IEEE 1451, Ethernet, wireless networking protocols such as 802.11b, and the like. In some cases, the sensors 10 can be configured to communicate over a network using such protocols.

An electrical device 44 can be electrically connected to the terminals 32, 34 so that the device 44 can detect the electric potential between the contact surfaces 14, 16 of the piezoelectric sensory device 12. By measuring the electric potential between the contact surfaces 14, 16, the device can determine the magnitude of pressure or force exerted on the sensor 10, and hence, the pressure or force exerted on the surface 52 of the test member 50 at the position of the sensor 10 on the surface 52. In particular, the device 44 can be an electrical monitoring device in electrical communication with the terminals 32, 34 by wires 46, electrically conductive traces, or other conductive members and configured to monitor, record, and/or analyze the voltage between the terminals 32, 34.

The sensor 10 can be relatively thin, especially as compared to conventional pressure sensors. For example, the thickness of the piezoelectric sensory device 12 can be less than about 0.003 inch, such as about 0.001 inch or less, and each of the substrate 20 and the sheet 22 can also have a thickness that is less than about 0.003 inch, such as about 0.001 inch, so that the overall thickness of the sensor 10 is less than about 0.01 inch and, in some cases, between about 0.003 inch and 0.005 inch. Thus, the sensor 10 can be disposed on the surface 52 of the test member 50 and typically does not require forming an aperture in the test member 50 for receiving the sensor 10. Further, the sensor 10 can be disposed on the surface 52 of the test member 50, e.g., in the airstream proximate the member 50 as shown in FIG. 3, without significantly disturbing the aerodynamic characteristics of the test member 50.

An adhesive film 36 can be provided on the substrate 20 opposite the piezoelectric sensory device 12, such that the sensor 10 can be adhered to the test member 50 in a desired position. Various adhesives can be used, and the adhesive can provide a strong bond to resist loosening or detachment of the sensor 10 during testing, e.g., when subjected to high speed winds or other forces. However, the adhesive can also be configured to allow the sensor 10 to be removed from the test member 50. For example, the sensor 10 can be peeled from the surface 52 of the test member 50 after a test operation so that the test member 50 can be reconfigured for further testing or used in other operations. Thus, the sensor 10 of the present invention is compatible with testing operations that do not require the significant modification and structural weakening of the test member 50. Further, due to the relatively small size of the sensor 10, the sensor 10 can be disposed in positions for which detection with conventional devices would be difficult or impossible. For example, the sensor 10 can be disposed on thin test members, or thin portions of a test member, or in other positions of limited space where larger devices would not fit.

The other dimensions of the sensor 10 can also be relatively small. For example, in some cases, each dimension of the piezoelectric sensory device 12 of the sensor 10 can be less than about 0.2 inch. For example, the piezoelectric sensory device 12 can be a layer of piezoelectric material that is rectangular in shape with each edge of the sensory device 12 having a length that is about 0.15 inches or less. Alternatively, the sensory device 12 can define other shapes, such as a generally circular layer with a diameter that is less than about 0.2 inch, or various other generally two- or three-dimensional shapes. The sensor 10 can be larger; however, by keeping the size of the sensor 10 relatively small, a greater number of the sensors 10 can be disposed on a given area of the test member 50.

While FIGS. 1 and 2 illustrate a sensor 10 having a single piezoelectric sensory device 12 for detecting pressure at substantially a single location on the surface 52 of the test member 50, a plurality of the sensors 10 of the present invention can also be configured in a sensor array 60 on the surface 52 of the test member 50 for measuring a plurality of pressures on the surface 52. For example, as shown in FIGS. 3 and 4, each array 60 can include a plurality of the sensors 10 disposed between the electrically insulative substrate 20 and the electrically insulative sheet 22. Each sensor array 60 in FIGS. 3 and 4 includes 16 separate piezoelectric sensory devices 12, though any number of sensors 10 can be configured in a single array 60.

Figure 5:
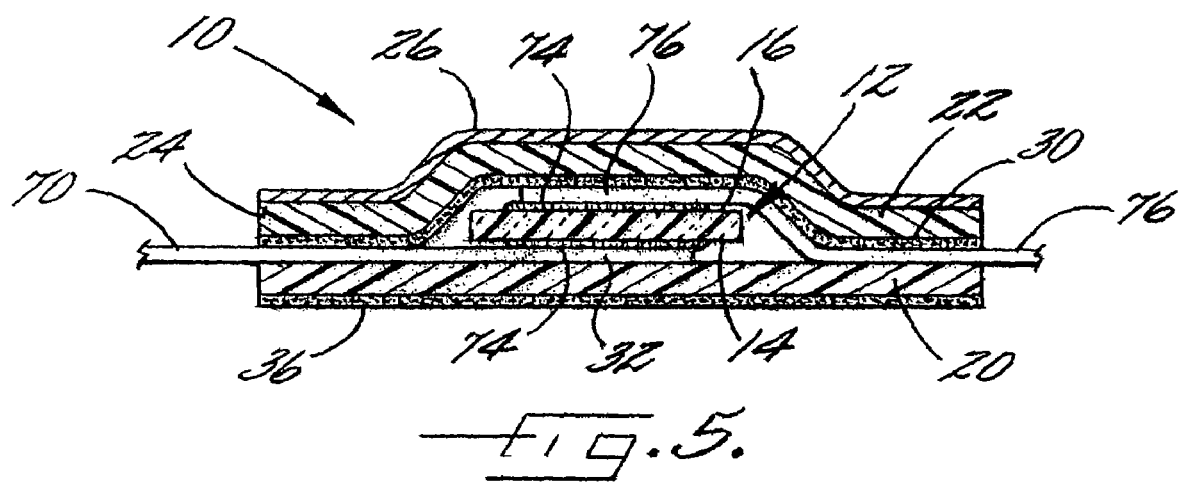
FIG. 5 is a section view illustrating one of the sensors as seen along line 5—5 of FIG. 4.
Figure 6:
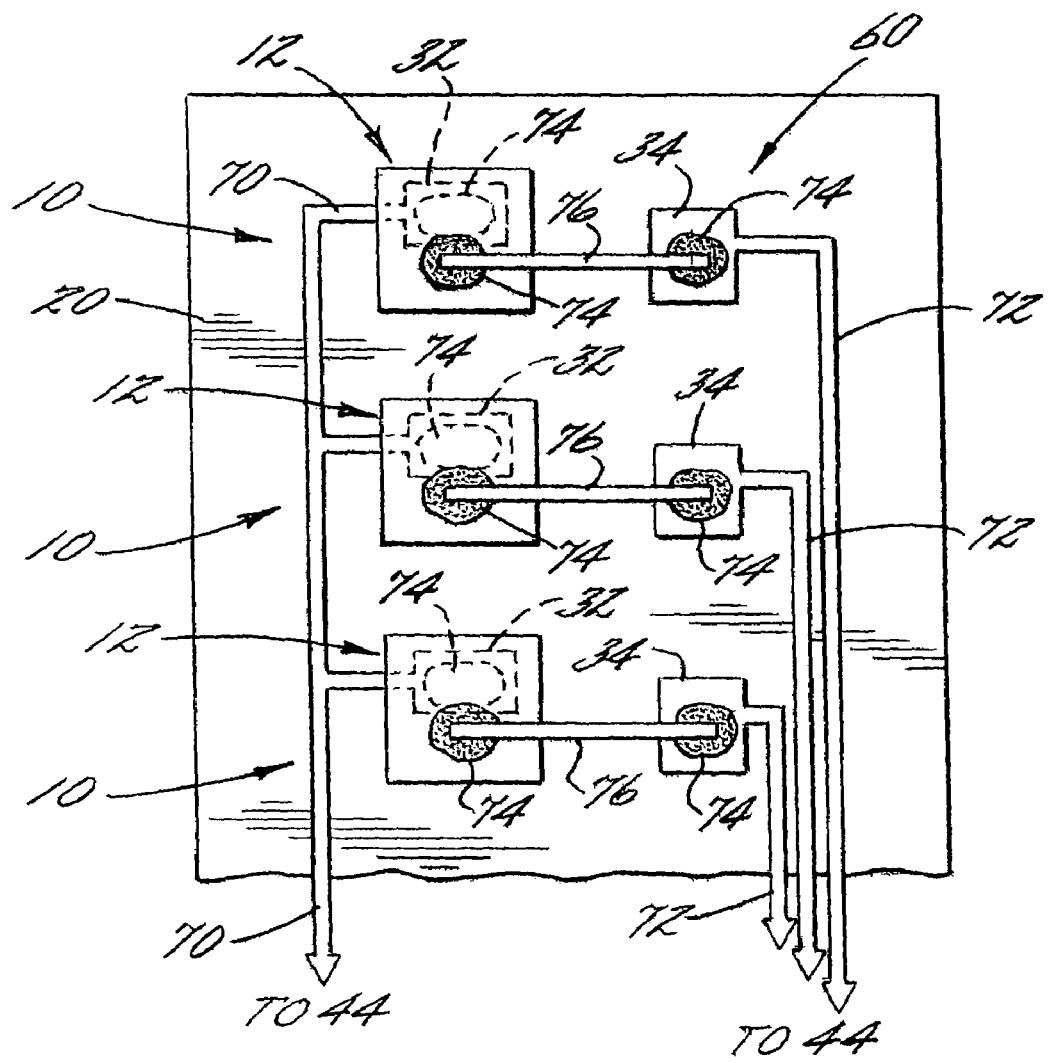
FIG. 6 is a plan view illustrating part of the array of FIG. 4, shown without the insulative sheet for purposes of illustrative clarity.

The configuration and connection of the piezoelectric sensory devices 12 is further illustrated in FIGS. 5 and 6. Each piezoelectric sensory device 12 in each array 60 is electrically connected to the terminals 32, 34 so that the electric potential between the contacts of each sensory device 12 can be detected by measuring the electric potential between the respective terminals 32, 34. In some cases, some or all of the first terminals 32 of each array 60 are electrically connected to one another so that the first contact surfaces 14 of several or all of the piezoelectric sensory devices 12 are connected. However, the second terminals 34, which are connected to the second contact surfaces 16 of the piezoelectric sensory devices 12, are electrically separate. The monitoring device 44 can be electrically connected to each of the first contact surfaces 14 via a single electrical connection to the first terminals 32, and the device 44 can be separately connected to each of the other terminals 34. Thus, the device 44 can detect the electric potential between each terminal 34 and the first terminal 32, to thereby determine the pressure at the position of each sensor 10.

The array 60 can be disposed on the test member 50 so that the various piezoelectric sensory devices 12 are provided at a plurality of positions. For example, if the test member 50 is a wing as shown in FIG. 3, each array 60 can extend in a direction between the leading and trailing edges 54, 56 of the wing so that each array 60 can be used to detect a pressure profile between the leading and trailing edges 54, 56. As illustrated, the array 60 can be extend over a contoured portion of the test member 50, e.g., to extend around edges of the test member 50 and onto multiple sides or surfaces of the test member 50. In this regard, as shown in FIG. 3, the outer surface 52 of the wing can define a contour, such as a complex curvature of an airfoil, and the array 60 can be flexed or bent to correspond to the configuration of the surface 52. In addition, the array 60 can have a non-linear configuration, such as is shown in FIG. 4, so that the array 60 can be disposed on the test member 50 in the desired configuration. Further, multiple arrays 60 can be disposed on the test member 50 to detect pressure on different portions of the test member 50, e.g., at different positions along the length of the wing. In fact, the sensors 10, or arrays 60 of sensors 10, can be disposed on any portion of the test member 50 and any combination of portions of the test member 50, depending on the positions for which pressure measurement is desired. Due at least in part to the small size of the sensors 10, the array 60 can be positioned near or on the leading and trailing edges 54, 56, including positions where the test member is too thin to accommodate a conventional pressure monitoring device that must be received in an aperture of the member.

The substrate 20 can be a flexible circuit material, such as Mylar® material or polyamide, and at least some of the contact surfaces 14, 16 of the piezoelectric sensory devices 12 can communicate via conductive traces that are disposed on the substrate 20. For example, a plurality of traces 70, 72 of a metallic conductor can be printed or otherwise disposed on the substrate 20 to form electrical circuit paths for communicating with the sensors 10, and the metallic traces 70, 72 can also define the terminals 32, 34 as pads or contact portions of disposed metallic material for connecting the respective traces 70, 72 to the piezoelectric sensory devices 12. As shown in FIG. 5, the first contact surface 14 of each piezoelectric sensory device 12 can be disposed against one of the first terminals 32 defined by the first conductive trace 70 and connected to the terminal 32, e.g., by silver epoxy 74 or another conductive adhesive material disposed between the first contact surface 14 and the terminal 32.

The second contact surface 16 of each piezoelectric sensory device 12 can be connected to the second conductive traces 72, each of which can communicate separately with the monitoring device 44. For example, the contact surface 16 of each piezoelectric sensory device 12 can be connected to one of the second terminals 34 defined by the second traces 72 by a jumper wire 76. The jumper wire 76 can be connected to the second contact surface 16 and the respective trace 72 by silver epoxy, solder, or the like, and typically is electrically separate from the other surface 14 and the trace 70 connected to the surface 14.

Each of the conductive traces 70, 72 can extend along the length of the array 60 to a connector 62 such that the monitoring device 44 can be connected to the traces 70, 72 on the substrate 20 via a connector 64 that corresponds to the connector 62 and thereby connects to each of the piezoelectric sensory devices 12 of one or more of the arrays 60. That is, the first terminals 32 are connected to the device 44 via the trace 70 and the connector 62, and the second terminals 34 are connected to the device 44 via the traces 72 and the connector 62. The connector 62 can include pins, sockets, or other electrically conductive connection elements, each of which corresponds to one of the traces 70, 72 and, hence, one or more of the contact surfaces 14, 16 of the piezoelectric sensory devices 12.

One or more of the sensors 10, such as one or more of the arrays 60 of sensors 10, can be disposed on a surface 52 of the test member 50 and used to detect pressure exerted against the test member 50. For example, the sensors 10 can be used to determine the pressure and variation of pressure on the test member 50 while the test member 50 is subjected to a fluid wind, such as typically occurs during testing of an airfoil in a wind tunnel, during operation of an airfoil or other member of a vehicle during travel of the vehicle through air or water, or the like. In particular, each sensor 10 can be used to determine the buffeting effect on the test member 50 due to variations in the wind load at a position on the surface 52. After such testing is complete, the sensor(s) 10 can be removed from the test member 50, e.g., by peeling the substrate 20 from the test member 50. In some cases, the test member 50 can then be subjected to further testing or operation, with sensors 10 affixed in other positions of the test member 50. Further the sensors 10 can be re-used for testing of the same member 50 or another member.

In some cases, the sensors 10 can be provided in one or more pressure belts, each belt including a plurality of interconnected belt segments with a substrate having an electrically conductive digital data bus. Thus, the sensors can communicate via the data bus, e.g., to a remotely-located controller such as the device 44. A "System and method for measuring physical parameters using an integrated multisensor system" is further described in U.S. Pat. No. 6,134,485, which is incorporated by reference. Relative to the device described in U.S. Pat. No. 6,134,485, the sensors 10 of the present invention (and belts or other devices formed with the sensors 10) can be substantially thinner. In addition, the sensors 10 of the present invention can measure quasi-static pressures as well as dynamic (time varying components of flow).

The invention is not limited to the specific disclosed embodiments. Although specific terms are employed, they are used in a generic and descriptive sense only and not for purposes of limitation.

What is claimed is:

1. A sensor configured to be disposed on a surface of a test member for measuring a pressure on the surface of the test member, the sensor comprising:
    an electrically insulative substrate configured to be disposed on the test member and adhered to the test member;
    a piezoelectric sensory device disposed on the substrate, the piezoelectric sensory device defining first and second contact surfaces and being adapted to provide an electric potential between the contact surfaces corresponding to a pressure on the piezoelectric sensory device; an electrically insulative sheet disposed opposite the piezoelectric sensory device from the substrate such that the piezoelectric sensory device is disposed between the substrate and the insulative sheet; and
    electrically conductive terminals in electrical communication with the contact surfaces of the piezoelectric sensory device such that the terminals are configured to provide the electric potential indicative of the pressure on the surface of the test member.

2. A sensor according to claim 1, further comprising an electrically insulative sheet disposed opposite the piezoelectric sensory device from the substrate such that the piezoelectric sensory device is disposed between the substrate and the insulative sheet.

3. A sensor according to claim 1 wherein the substrate comprises polyimide tape.

4. A sensor according to claim 1 wherein the piezoelectric sensory device comprises a sheet of a polymer.

5. A sensor according to claim 1 wherein the piezoelectric sensory device comprises polyvinylidene fluoride.

6. A sensor according to claim 1 wherein the piezoelectric sensory device defines a thickness of less than about 0.001 inch.

7. A sensor according to claim 1 wherein the insulative sheet includes a metallic layer adapted for electromagnetically shielding the piezoelectric sensory device.

8. A sensor according to claim 1 wherein the electrically insulative sheet comprises a flexible sheet formed of at least one of the group consisting of polyimide and polyester.

9. A sensor according to claim 1 wherein the substrate comprises a flexible circuit and at least one of the terminals is connected to the piezoelectric sensory device via an electrical circuit path on the flexible circuit.

10. An article outfitted for surface pressure testing comprising the sensor according to claim 1, wherein a plurality of piezoelectric sensory devices are disposed between the substrate and the insulative layer such that the sensor is configured to measure the pressure at a plurality of positions on the test member corresponding to positions of the plurality of piezoelectric sensory devices.

11. A sensor according to claim 1, further comprising an adhesive film disposed on the substrate opposite the piezoelectric sensory device and configured to adhere the sensor to the test member in a configuration corresponding to a contour of the test member.

12. A sensor according to claim 1, further comprising an electronic monitoring device electrically connected to the piezoelectric sensory device via the terminals such that the electronic monitoring device is configured to monitor the electric potential provided by the piezoelectric sensory device.

13. A sensor array configured to be disposed on a surface of a test member for measuring a plurality of pressures on the surface of the test member, the sensor array comprising:
an electrically insulative substrate configured to be disposed on the test member and adhered to the test member;
a plurality of piezoelectric sensory devices disposed on the substrate, each respective piezoelectric sensory device defining first and second contact surfaces and being adapted to provide an electric potential between the contact surfaces corresponding to a pressure on the respective test member;
an electrically insulative sheet disposed opposite the piezoelectric sensory devices from the substrate such that the piezoelectric sensory devices are disposed between the substrate and the insulative sheet; and
electrically conductive terminals in electrical communication with the piezoelectric sensory devices such that the terminals are configured to provide the electric potentials between the contact surfaces of each piezoelectric sensory device and thereby detect a pressure on the surface of the test member at a position corresponding to each piezoelectric sensory device.

14. A sensor array according to claim 13 wherein the sensor is flexible such that the sensor is capable of being disposed on the test member in a configuration corresponding to a contour of the test member.

15. A sensor array according to claim 13 wherein the substrate comprises polyimide tape.

16. A sensor array according to claim 13 wherein the insulative sheet includes a metallic layer adapted for electromagnetically shielding the piezoelectric sensory device.

17. A sensor array according to claim 13 wherein the electrically insulative sheet comprises a flexible sheet formed of at least one of the group consisting of polyimide and polyester.

18. A sensor array according to claim 13 wherein the substrate comprises a flexible circuit and at least some of the terminals are connected to the piezoelectric sensory device via an electrical circuit path on the flexible circuit.

19. A sensor array according to claim 13, further comprising an adhesive film disposed on the substrate opposite the piezoelectric sensory devices and configured to adhere the sensor to the test member in a configuration corresponding to a contour of the test member.

20. A sensor array according to claim 13, further comprising an electronic monitoring device electrically connected to the piezoelectric sensory devices via the terminals such that the electronic monitoring device is configured to monitor the electric potentials provided by the piezoelectric sensory devices.

21. An airplane outfitted for surface pressure testing, comprising a sensor array according to claim 13.

22. A method of measuring a pressure on a surface of a test member, the method comprising:
providing a sensor having an electrically insulative substrate, a piezoelectric sensory device disposed on the substrate and adapted to provide an electric potential between the contact surfaces corresponding to a pressure on the piezoelectric sensory device, and electrically conductive terminals in electrical communication with the piezoelectric sensory device; disposing an electrically insulative sheet opposite the piezoelectric sensory device from the substrate such that the piezoelectric sensory device is disposed between the substrate and the insulative sheet; and
adhering the substrate carrying the piezoelectric sensory device and the electrically insulative sheet to the surface of the test member; and
detecting the electric potential between the terminals and thereby determining a pressure on the surface of the test member.

23. A method according to claim 22 wherein said adhering step comprises flexing the sensor to a contour of the surface of the test member.

24. A method according to claim 22, further comprising providing a metallic layer opposite the piezoelectric sensory device from the substrate such that the metallic layer electromagnetically shields the piezoelectric sensory device.

25. A method according to claim 22, further comprising disposing a plurality of piezoelectric sensory devices between the substrate and the insulative layer and detecting the pressure on the surface of the test member corresponding to a position of each of the piezoelectric sensory devices.

26. A method according to claim 22 wherein said detecting step comprises electrically connecting an electronic monitoring device to the piezoelectric sensory device via the terminals such that the electronic monitoring device is configured to monitor the electric potential provided by the piezoelectric sensory device.

* * * * *